United States Patent Office

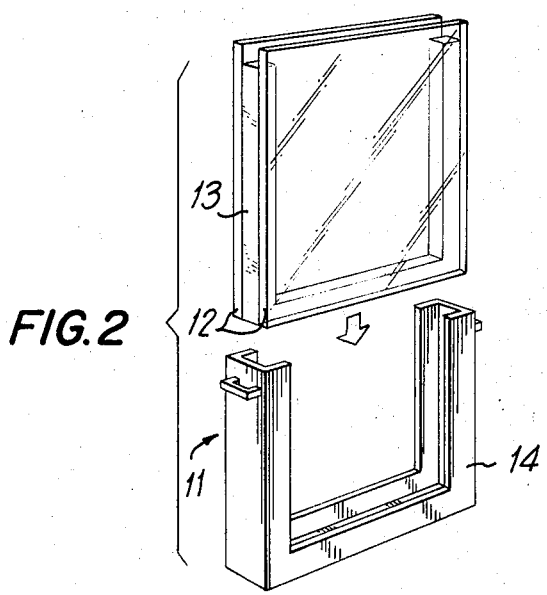
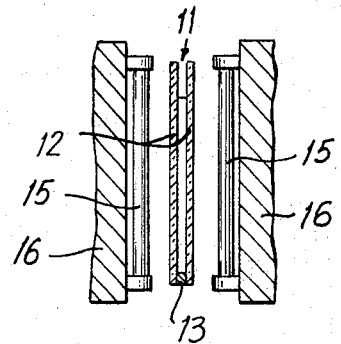
FIG. 2
FIG. 3
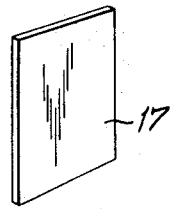
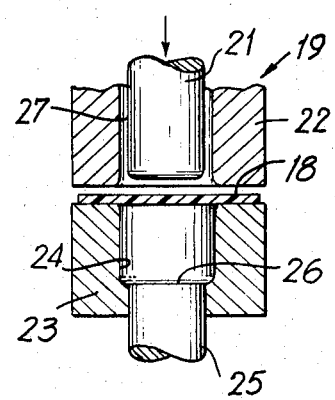
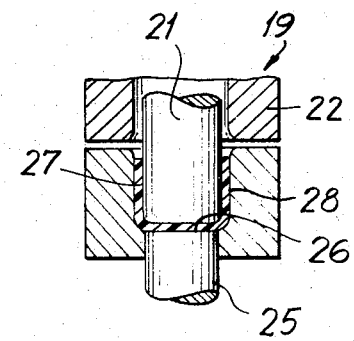
FIG. 4
FIG. 5
FIG. 6
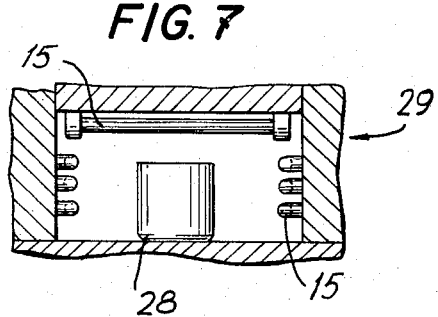
FIG. 7

3,773,869
Patented Nov. 20, 1973

3,773,869
BULK-POLYMERIZATION METHOD INCLUDING A COLD-FORMING STEP
Moriji Kurobe, Nobuhiro Ito, and Hidero Takahashi, Nagoya, Japan, assignors to Kabushiki Kaisha Toyota Chuo Kenkyusho
Filed May 11, 1971, Ser. No. 142,195
Claims priority, application Japan, May 12, 1970, 45/40,823
Int. Cl. B29c 25/00
U.S. Cl. 264—22      14 Claims

ABSTRACT OF THE DISCLOSURE

This invention relates to a method of producing a resin article by polymerizing a bulk-polymerizable thermoplastic resin to an intermediate stage at which it has a large plastic deformation region. Polymerization is interrupted at this stage and the article is cold-formed. Finally, polymerization is continued until the resin is substantially completely polymerized.

BACKGROUND OF THE INVENTION

Although attempts have been made to cold-form plastic stock at temperatures between say 10° and 30° C., such attempts have generally been unsuccessful, the product showing cracks or other types of blemishes. Consequently, it has been the practice to form such articles at substantially higher temperatures, for example, 100° to 140° C. for acrylic resin.

Although articles of satisfactory quality can be prepared by such high-temperature forming, such an operation is costly due to the necessity for providing controlled heat to the forming equipment; moreover, the process is relatively slow because of the fact that the temperature of the stock to be formed must be raised. The resultant drop in production rate also entails an increase in cost.

SUMMARY OF THE INVENTION

An intermediate-stage material suitable for cold-forming is produced in the polymerization of a bulk-polymerizable resin monomer if the polymerization is halted before completion. In general, the degree of conversion at interruption should be between 60% and 95%, depending on the particular monomer used. Here, the degree of conversion means the percentage to which the original monomer has been converted to polymer. More specifically, polymerization should be interrupted at a stage such that the intermediate product has a long region of plastic deformation. Such a stock can be cold-formed in a variety of processes such as drawing, rolling, extruding, into a form free of blemishes. After cold-forming, polymerization of the resin, now in final form, can be completed.

Suitable bulk-polymerizable resins are acrylic resins and styrene. Also, mixtures of monomers may be used to produce cold-formed articles of co-polymers such as acrylonitrile-styrene.

Polymerization in either stage or in both stages may be carried out by any of the usual processes such as thermo-polymerization, photo-polymerization or irradiation-polymerization.

Accordingly, an object of the present invention is the preparation of shaped plastic articles where the articles are shaped by a cold-forming process.

A further object of the invention is the preparation of shaped plastic articles at a higher production rate than is now possible.

Still another object of the present invention is the preparation of shaped plastic articles at lower cost.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWING

For a fuller understanding of the invention, reference is had to the following description taken in connection with the accompanying drawing in which:

FIG. 2 is an exploded view of a vessel for carrying out the polymerization of a monomer to an intermediate stage;

FIG. 3 is an end view of the same vessel in position for irradiation with light;

FIG. 4 is a perspective view of a sheet formed in the vessel;

FIG. 5 shows the sheet in position for deep-drawing;

FIG. 6 shows, in cross section, a cup drawn from the sheet; and

FIG. 7 shows the drawn cup in position for irradiation-polymerization to complete polymerization.

DESCRIPTION OF THE PREFERRED EMBODIMENTS

Figure 1:
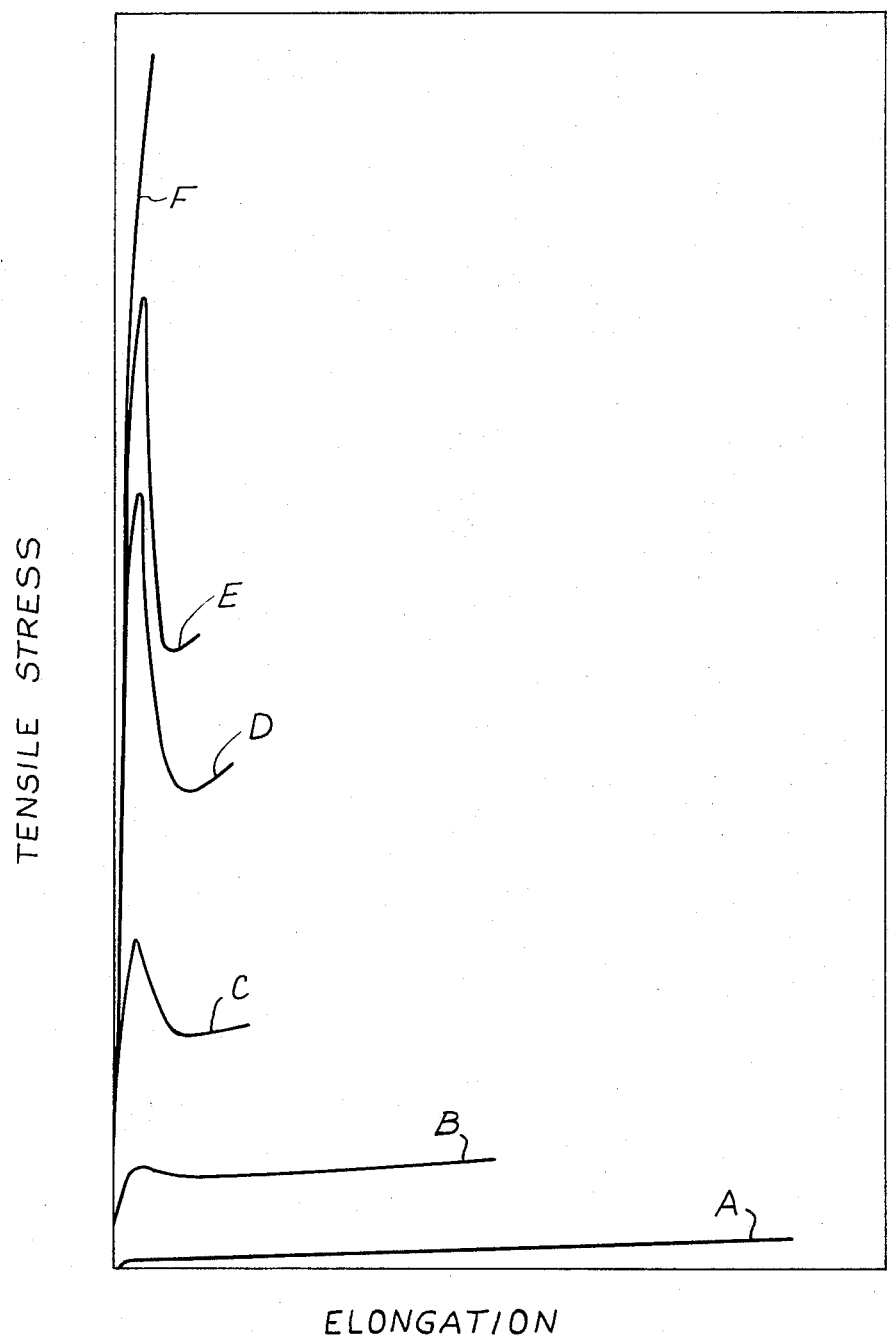
FIG. 1 is a graph showing stress-strain curves at room temperature for resins at various stages of polymerization.

In general, the present invention provides a method by which bulk-polymerizable thermoplastic resins may readily be cold-formed. The steps of the method are:

(1) Polymerizing the resin monomer to a bulk stock material with a degree of conversion lying within the range of 60 to 95%;

(2) Cold-forming the bulk material obtained by step 1 by an operation such as drawing, rolling or the like to produce a semi-finished article of the desired shape, and (3) Completing the polymerization of the shaped article.

In step 1, polymerization of the monomer may be effected by the use of heat, illumination with light, or irradiation with nuclear radiation. If desired, catalysts such as benzoin or benzoyl peroxide may also be used in combination with the above treatments. When the desired degree of conversion is reached, the polymerization is interrupted by removing the energy source, whether this is heat, light or nuclear radiation.

Although it is stated above that polymerization should be halted when the degree of conversion lies between 60 and 95%, actually polymerization should be carried out to an extent which is appropriate to the particular resin involved and to the particular type of cold-forming operation to which it is to be subjected. FIG. 1 shows stress-strain curves for a methylmethacrylate resin, the curves being taken at 25° C. Curve A corresponds to 75% degree of conversion; Curve B; 85%; Curve C, 90%; Curve D, 93%; Curve E, 95% and Curve F is for a completely polymerized resin. Curves B, C, D and E initially show an almost vertical rise which then drops off to an almost horizontal portion. The flat portion is the plastic deformation region in which cold-forming can be performed. The completely cured resin corresponding to Curve F has no plastic deformation region, and in consequence is brittle and cannot be cold-formed without cracking the material.

As is evident from FIG. 1, the extent of the plastic deformation region decreases as the degree of conversion increases. Where the degree of conversion is too low, in general, less than 60%, the stock, even if solid, is too soft for satisfactory forming. Where the degree of conversion is above 95% the ductility of the stock is too low.

For control of the first polymerization step, it is necessary that an analytical technique to determine the degree of conversion be available. The degree of conversion of an acrylic resin is measured by the following method, the method being adaptable by obvious means to other resins. A specimen of the resin is taken and precisely weighed, the weight being designated as S. The specimen is dissolved in acetone and methanol is then added thereto to cause precipitation. The precipitate is filtered from the solution and dried at a temperature of 70° C. for 24 hours. Since only the polymer is precipitated, the weight T of the precipitate divided by the sample weight S and multiplied by 100 is taken as the uncorrected degree of conversion. To correct this value, a calibration curve is prepared by adding known weights of polymer to known weights of monomer, taking the resultant mixtures into solution in acetone and treating as above. Naturally, a different calibration curve must be prepared for each type of resin under consideration.

With this simple analytical technique at hand, it becomes possible to match the degree of conversion of the stock to the intended cold-forming operation. For instance, a degree of conversion of 90% is preferable for rolling, whereas a degree closer to 80% is preferable for deep-drawing, the exact range depending on the particular resin.

Following are examples showing how the process is carried out.

Example 1

300 parts of methylmethacrylate (hereinafter called MMA) and 0.6 part of benzoin (this weight ratio was used in all of the examples to be described below) as a polymerization initiator were placed in reaction vessel 11 of FIG. 2. The vessel consists of two glass sheets 12 separated by a soft, U-shaped insoluble spacer 13, glass sheets 12 and spacer 13 being supported and held together by U-shaped frame 14. In this case, the spacer was 1.5 mm. thick and the inside, bottom length of the spacer was 15 cm.

To effect polymerization, the vessel 11, as shown schematically in FIG. 3, was placed between light sources 15 held in encasement 16. The light sources consisted of four 40 watt fluorescent lamps emitting ultraviolet radiation. The reaction mixture in the vessel was irradiated for two hours, 15 minutes. The vessel 11 was then disassembled to obtain a soft plastic sheet 17 (FIG. 4).

A disk blank having a diameter of 10 cm. was punched from the sheet 17 and placed in press 19 of FIG. 5 between punch 21 and blankholder 22 at the upper face and lower die 23 at the lower face. The lower die 23 has a surface 24 for forming the outer surface of a cup and a knock-out 25 having a surface 26 for forming the bottom surface of the cup. The punch 21 has a surface 27 for forming the inner surface of the cup. The cup 28 (FIG. 6) was drawn at 20° C.

After drawing, the cup 28 was placed in enclosure 29 where it was subjected to further ultraviolet radiation on its upper and lateral surfaces for two hours. Tests showed the resin to be completely polymerized. Moreover, the dimensions of the completely polymerized cup were identical with those of the cup immediately after drawing. The cup was also free of blemishes such as cracks.

Example 2

A mixture of 50 parts of acrylonitrile monomer, 100 parts of styrene monomer and 0.4 part of benzoin was irradiated with ultraviolet radiation to obtain a prepolymer with a degree of conversion of approximately 15%. The liquid prepolymer was placed in the glass reactor 11 of Example 1 and again irradiated to produce a sheet with a degree of conversion of 85%.

The sheet was deep-drawn at 15° C. in the press 19. The liquid prepolymer was placed in the glass reactor 11 of Example 1 and again irradiated to produce a sheet with a degree of conversion of 85%.

The sheet was deep-drawn at 15° C. in theh press 19. The cup of partly polymerized resin was further photo-irradiated for two hours to complete the polymerization, thus producing a cup of acrylonitrile-styrene resin. The product was free of cracks, had smooth surfaces and had diminisions identical with those of the semi-finished article.

Example 3

300 parts of MMA monomer and 0.5 part of benzoyl peroxide were placed in a reactor and heated at approximately 60° C. for two hours and twenty minutes. The prepolymer produced in this way had a degree of conversion of 15%. The prepolymer was placed in the glass reaction vessel 11 and heated for three hours in an air bath at 60° C. to produce a sheet having a degree of conversion of 93%. The thickness of the sheet was 2.7 mm. The sheet was rolled at about 30° C. and then photo-irradiated for two hours to complete polymerization.

Table 1 shows the clearance between the rollers of a two-high mill and the dimensions after rolling and after complete polymerization.

TABLE 1

| | After rolling | | After complete polymerization—sheet thickness (mm.) |
|---|---|---|---|
| Roller clearance (mm.) | Sheet thickness (mm.) | Percentage reduction in thickness | |
| 2.0 | 2.38 | 13 | 2.39 |
| 1.5 | 2.00 | 26 | 2.04 |

As is evident from the above table, a reduction in thickness of 26 percent could be achieved. The thickness of the sheet after completion of polymerization was nearly identical with that of the sheet immediately after rolling. The rolling operation was easily carried out, and there was no evidence of flaw in the sheet immediately after completion of polymerization. Moreover, the completely polymerized sheet showed substantially higher ductility than sheet of the same resin which had been completely polymerized in one step without any rolling at an intermediated stage of polymerization.

In summary, the present invention recites the polymerization of bulk-polymerizable thermoplastic resin monomer by means of heating, photo-irradiation or nuclear solution to an intermediate stage at which the resin has a long plastic deformation range, cold-forming the partially polymerized stock and completing the polymerization of the shaped material. Cold-forming by this procedure requires the expenditure of but little energy and can be carried out by a variety of processes including deep-drawing, extrusion and rolling. Also, polymerization can be completed while the shaped article is held in a die. Residual stress in the formed article is very small, because of the fact that the cold-forming operation is carried out within a polymerization range having a large region of plastic deformation.

It will thus be seen that the objects set forth above, among those made apparent from the preceding description, are efficiently attained and, since certain changes may be made in carrying out the above process without departing from the spirit and scope of the invention, it is intended that all material contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of forming a plastic article, comprising the steps of polymerizing a bulk-polymerizable thermoplastic resin monomer in the absence of cross-linkable compounds, said resin monomer being selected from the group consisting of acrylic monomer, styrene monomer and mixtures thereof to a solid having a degree of conversion lying between 80% and 95%, cold-forming said solid into an article at a temperature between 10° C. and 30° C., and completing the polymerization of said solid article.

2. A method as defined in claim 1, wherein at least one of said polymerization steps is effected by thermal means.

3. A method as defined in claim 1, wherein at least one of said polymerization steps is effected by illumination with light of an effective wave-length.

4. A method as defined in claim 1, wherein at least one of said polymerization step is carried out by irradiation with nuclear radiation.

5. A method as defined in claim 1, wherein said cold-forming step includes drawing.

6. A method as defined in claim 1, wherein said cold-forming step includes rolling.

7. A method as defined in claim 1, wherein said cold-forming step includes extruding.

8. A method as defined in claim 1, wherein said cold-forming step includes punching.

9. A method as defined in claim 1, wherein said cold-forming step includes forging.

10. A method as defined in claim 1, wherein said cold-forming step includes stamping.

11. A method as defined in claim 1, wherein said solid is cold-formed in a die, and said polymerization of said solid article is carried out in said die.

12. A method as defined in claim 1, wherein said bulk-polymerizable resin is a thermoplastic resin.

13. A method as defined in claim 1 wherein said acrylic resin monomer is polymerized to the extent of 85% prior to cold-forming, and said solid to be cold-formed is a sheet.

14. A method as defined in claim 1, wherein said acrylonitrile-styrene resin monomer is polymerized to the extent of 85% prior to cold-forming, and said solid to be cold-formed is a sheet.

References Cited
UNITED STATES PATENTS

| | | | |
|---|---|---|---|
| 2,912,418 | 11/1959 | Johnson et al. | 264—236 |
| 2,330,516 | 9/1943 | Plain | 264—236 |
| 3,634,579 | 1/1972 | Matras | 264—320 |

ROBERT F. WHITE, Primary Examiner

T. E. BALHOFF, Assistant Examiner

U.S. Cl. X.R.

264—40, 236